United States Patent [19]

Morgenthaler

[11] Patent Number: 4,518,339
[45] Date of Patent: May 21, 1985

[54] DOUGH-ROLLING MACHINE

[75] Inventor: Eugen Morgenthaler, Kirchberg, Switzerland

[73] Assignee: Seewer AG, Canton of Berne, Switzerland

[21] Appl. No.: 145,437

[22] Filed: May 1, 1980

[30] Foreign Application Priority Data

Jun. 5, 1979 [DE] Fed. Rep. of Germany ....... 2922702

[51] Int. Cl.³ .............................................. A21C 3/02
[52] U.S. Cl. ..................................... 425/367; 425/363
[58] Field of Search ............................... 425/363, 367

[56] References Cited

U.S. PATENT DOCUMENTS 2,619,048 11/1952 Fox ...................................... 425/367
3,003,438 10/1961 Naylor ................................ 425/367

FOREIGN PATENT DOCUMENTS 1775202 8/1958 Fed. Rep. of Germany .

Primary Examiner—James Derrington
Attorney, Agent, or Firm—Salter & Michaelson

[57] ABSTRACT

A dough-rolling machine intended principally for small-scale baking installations comprises a mechanism for driving the dough rollers in which a plurality of transmission wheels are disposed and interconnected in such a way that the arrangement is sufficiently compact to allow accommodation of the electrical control means of the machine together with the drive mechanism in the same size housing customarily used to accommodate the drive mechanism alone.

4 Claims, 3 Drawing Figures

DOUGH-ROLLING MACHINE

This invention relates to make-up equipment for baking, and more particularly to dough-rolling machines of the type having a lower roller rotating on a stationary lower shaft, an upper roller rotating on a swivelling upper shaft, and a drive motor situated above the rollers.

Dough-rolling machines of this type have been previously disclosed, e.g., in German Utility Model No. 17 75202, and have always represented very voluminous apparatus suitable only for large-scale operations. In order to obtain a comparatively small dough-rolling machine suitable for use in hospital kitchens, canteens, and the like, it is not feasible simply to scale down all the parts because the rollers, for instance, have to remain the same size. It has therefore been necessary to achieve the desired space saving by means of certain design changes.

It is an object of this invention to provide an improved dough-rolling machine of the above-mentioned type having a drive mechanism which is so compact that it can be accommodated together with the electrical control means in the same housing which was used for the drive mechanism alone in prior art dough-rolling machines.

To this end, in the dough-rolling machine according to the present invention, the improvement comprises a freewheeling compound transmission gear, consisting of a rear transmission wheel and a front transmission pinion, mounted on the lower shaft, the simple transmission wheel of which is drivingly connected to a transmission pinion fixed on the shaft of the drive motor, and the transmission pinion of which is drivingly connected to the middle transmission wheel of a further compound transmission gear seated loosely on a countershaft, the front transmission pinion of the further compound transmission gear driving the lower shaft via a simple transmission wheel fixed on the outermost front end of the lower shaft, and a pinion disposed on the inside of the further compound transmission gear meshing with a drive gear fixed on the upper shaft, this upper shaft being swivellable about the axis of the countershaft.

A preferred embodiment of the invention will now be described in detail with reference to the accompanying drawings, in which.

In this embodiment, the transmission wheels take the form of sprocket wheels, but they might equally well be replaced by V-belt connections.

Figure 1:
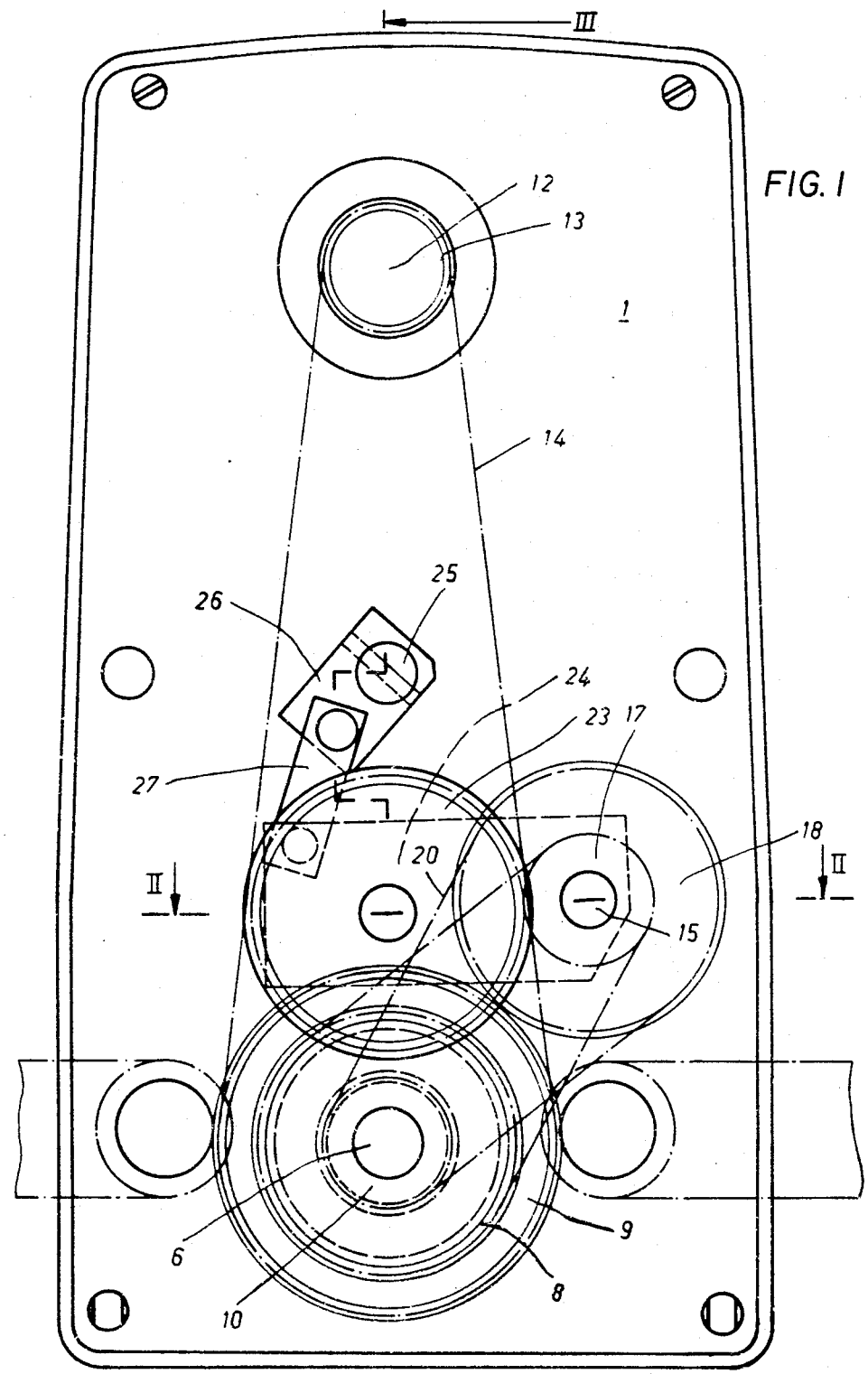
FIG. 1 is a diagrammatic elevation of a drive mechanism.
Figure 2:
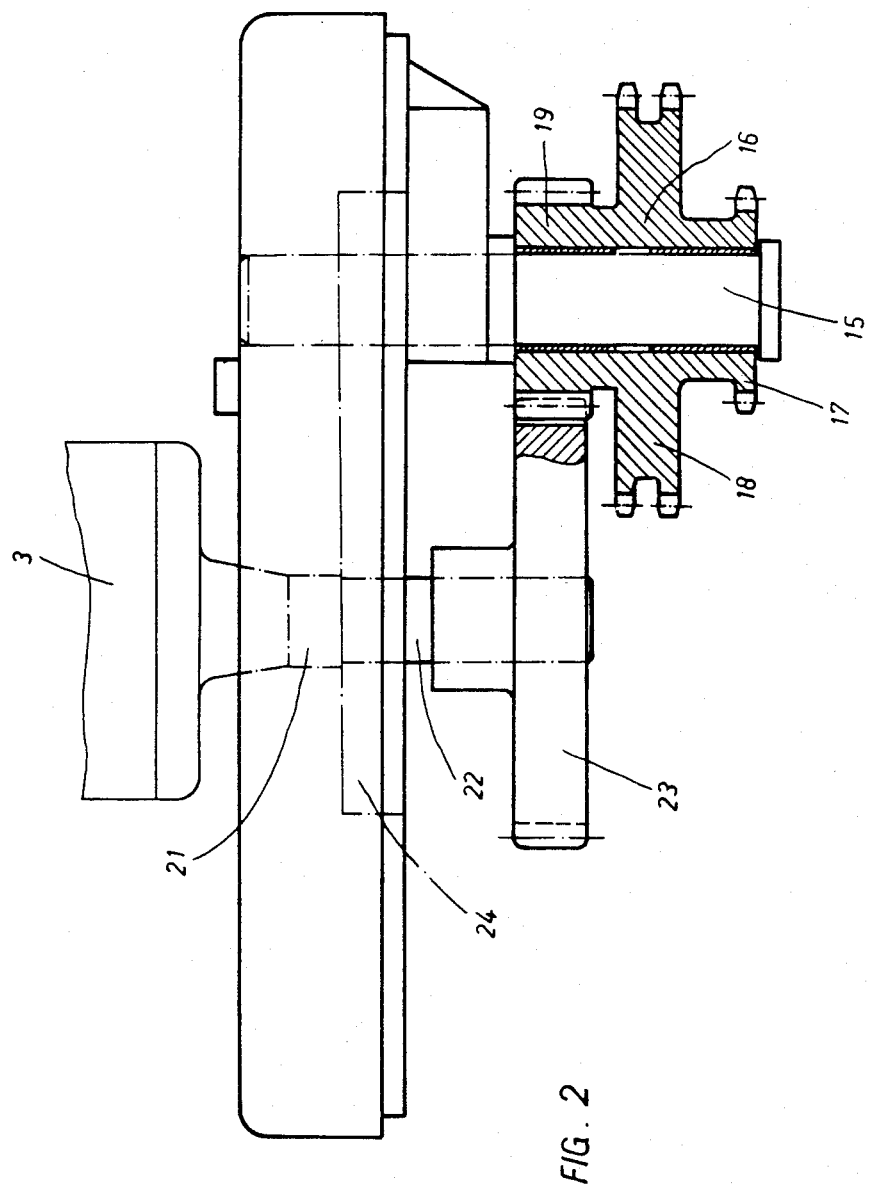
FIG. 2 is a top plan view on a larger scale of a partial section taken on the line II—II of FIG. 1.
Figure 3:
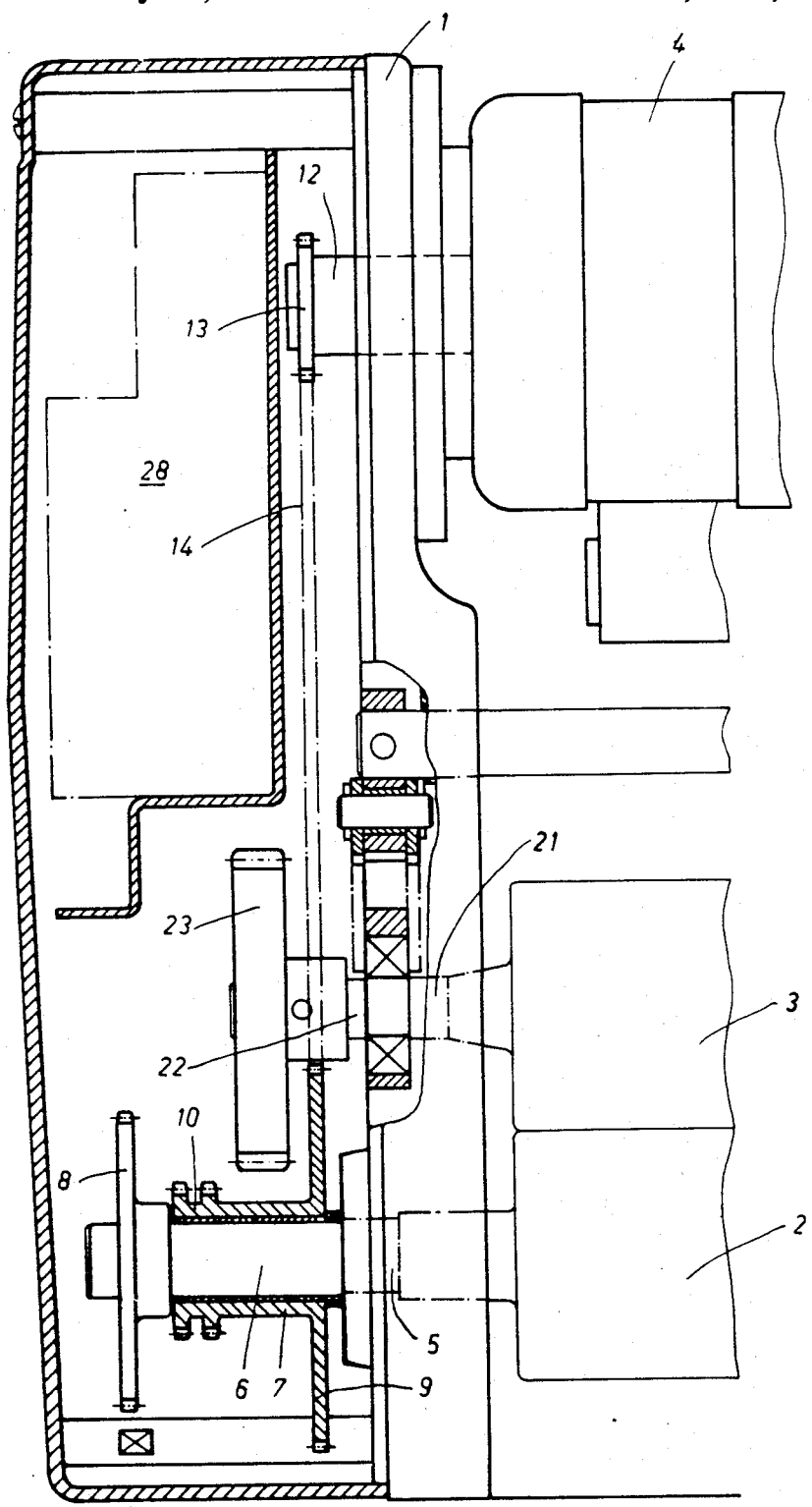
FIG. 3 is a section taken on the line III—III of FIG. 1.

FIG. 1 shows a side supporting structure 1 of a frame, within which a stationary lower roller 2 and a displaceable upper roller 3 are held. A drive motor 4 is secured to supporting structure 1 above rollers 2 and 3. A lower shaft 5 of lower roller 2 is mounted in frame structure 1 and includes an outwardly projecting extension 6 on which a freewheeling compound sprocket gear 7 and, at the outermost end, a simple fixed sprocket wheel 8 are mounted. Compound gear 7 comprises a simple sprocket wheel 9 and a smaller sprocket wheel 10 which takes the form of a twin wheel in the embodiment illustrated. A drive shaft 12 of motor 4 also extends out of structure 1 and bears on this extension a sprocket wheel 13 which is drivingly connected to wheel 9 of compound sprocket gear 7 by means of a chain 14 shown schematically in dot-dash lines. Also secured in frame structure 1 is a countershaft 15 (cf. especially FIG. 2) which projects out of structure 1 and on which a compound gear 16 is mounted loose. Compound gear 16 comprises an outer small sprocket wheel 17, a middle sprocket wheel 18 (shown as a twin wheel in this embodiment), and an inner pinion 19. Wheel 18 is drivenly connected by a chain 20, shown schematically in dot-dash lines in FIG. 1, to small sprocket wheel 10 of compound gear 7, so that wheel 18 can be caused to rotate about fixed countershaft 15 by motor 4. This rotary motion is transmitted to the two roller shafts, viz., a lower shaft 5 and an upper shaft 21, and thus to rollers 2 and 3, respectively, via a drive connection between sprocket wheel 17 and sprocket wheel 8 of lower shaft 5 and via pinion 19 which meshes with a gearwheel 23 seated on an outer extension 22 of upper shaft 21. For purposes of adjusting the roller gap, upper roller 3 is designed to be swivelled in a manner known per se. This swivelling is accomplished in that shaft 21 is caused to effect a movement of circular translation about the axis of countershaft 15 by means of a linkage comprising a rocker 24 and a pivot bar 25 (schematically indicated) linked by plates 26 and 27.

By means of this arrangement, and particularly the drive connection between motor wheel 13 and sprocket wheel 9, situated near the outer wall of frame supporting structure 1, it becomes possible to use the space 28 above the drive wheels of rollers 2 and 3 and next to the outer end of drive shaft 12, which space has been occupied by parts of the drive mechanism in prior art designs, for accommodating components of the electric circuit, which need not be shown or described in detail here.

Since such circuitry has previously always had to be accommodated in a separate housing, it has accounted for a considerable part of the space taken up by the dough-rolling machine as a whole. Because the arrangement described above makes it possible to do away with the hitherto customary additional accommodation for the circuit components, the result is an appreciable reduction in the space requirements of such dough-rolling machines, owing to which smaller units, suitable for use in hospitals and canteens, for example, can be constructed.

What is claimed is:

1. A dough-rolling machine of the type having a frame, a stationary shaft on which a first roller is mounted, a displaceable shaft on which a second roller is mounted, and a drive motor having a drive shaft, wherein the improvement comprises:
  a countershaft secured to said frame, said displaceable shaft being adapted for translatory rotation about the axis of said countershaft,
  a first transmission wheel fixed on said drive shaft,
  a second transmission wheel fixed on said stationary shaft,
  a drive gear fixed on said displaceable shaft,
  a compound transmission gear mounted loose on said stationary shaft between said second transmission wheel and said first roller and including a third transmission wheel, situated nearest said first roller and drivingly connected to said first transmission wheel, and a fourth transmission wheel situated remote from said first roller, and a further compound transmission gear mounted loose on said countershaft and including a pinion meshing with said drive gear, a fifth transmission wheel drivingly connected to said second transmission wheel, and a sixth transmission wheel situated between said pinion and said fifth transmission wheel and drivenly connected to said fourth transmission wheel.

2. The dough-rolling machine of claim 1, further comprising continuous, flexible drive-transmitting elements respectively connecting said first and third transmission wheels, said second and fifth transmission wheels, and said fourth and sixth transmission wheels.

3. The dough-rolling machine of claim 2, wherein each said transmission wheel is a sprocket wheel, said drive-transmitting elements being chains.

4. The dough-rolling machine of claim 2, wherein said drive-transmitting elements are belts.

* * * * *